US008857194B1

(12) United States Patent
Sutterlin et al.

(10) Patent No.: US 8,857,194 B1
(45) Date of Patent: Oct. 14, 2014

(54) HOST-GUEST COMPLEXES USED AS THERMAL ENERGY SYSTEMS

(76) Inventors: William Rusty Sutterlin, Tuscaloosa, AL (US); Praveen Thallapally, Richfield, WA (US)

(*) Notice: Subject to any disclaimer, the term of this patent is extended or adjusted under 35 U.S.C. 154(b) by 352 days.

(21) Appl. No.: 13/270,219

(22) Filed: Oct. 10, 2011

Related U.S. Application Data

(60) Provisional application No. 61/391,448, filed on Oct. 8, 2010.

(51) Int. Cl.
F25D 5/00 (2006.01)
(52) U.S. Cl.
USPC .................................................. 62/4
(58) Field of Classification Search
USPC ............... 62/4, 46.1, 49.1, 101, 476
See application file for complete search history.

(56) References Cited

U.S. PATENT DOCUMENTS

| 4,290,267 A | * | 9/1981 | Buchner | 60/648 |
| 5,153,072 A | * | 10/1992 | Ratner et al. | 428/461 |
| 6,560,971 B2 | * | 5/2003 | Takao et al. | 62/54.1 |

* cited by examiner

Primary Examiner — Melvin Jones
(74) Attorney, Agent, or Firm — Briggs and Morgan, P.A.

(57) ABSTRACT

A thermal energy storage material is described, including a host-guest complex wherein the combined rotational, vibrational, translational, and binding energies of a guest molecule are dependent upon the temperature of the surrounding environment. The host-guest complex may include nanoparticles having a topography, such as nanotubes, nanobowls, nanospheres, and nanocages. The host-guest complex may include a metal organic framework. The guest of the host-guest complex may be water, carbon dioxide, carbon monoxide, nitrogen, oxygen, acetone, methanol, ethanol, or another inert compound.

17 Claims, 8 Drawing Sheets

Thermal Battery with MOFs impregnated into the graphite monolith and in intimate contact with the Heat Pipes

HOST-GUEST COMPLEXES USED AS THERMAL ENERGY SYSTEMS

RELATED APPLICATIONS

This application claims the benefit of U.S. Provisional Patent Application No. 61/391,448, filed Oct. 8, 2010, the contents of which are incorporated herein by reference in their entirety.

BACKGROUND OF THE INVENTION

Many nanomaterial molecules may act as a "host" to other "guest" molecules. At certain temperatures the guest molecule will come out of the host or rearrange itself to an ordered/disordered state. In order for the guest molecule to come out of the host it must absorb a large amount of energy. If the guest molecule goes from an ordered state to a disordered state inside the host molecule then it also must absorb large amounts of energy. Conversely, if the guest goes from a disordered to an ordered state it releases energy.

The encapsulation of guest molecules using zeolites, fullerenes, micelles and clathrates is well known. However, in these complexes, there is typically a relatively low amount of chemical binding to the host, and the host mass to guest mass ratio is extremely high. These factors limit the peak enthalpies of the complexes.

Organic and metal organic frameworks are self assembled via hydrogen bonding or metal coordination to create network topologies that act as a host to bind guest molecules that undergo reversible interactions with the host molecule. This class of compounds can be considered as a subset of supramolecular and coordination polymers. This subset that focuses on inclusion compounds has attracted much attention in recent years. These molecules are promising in regard to their fundamental and practical applications such as molecular recognition, crystal engineering, chemical sensing, new solid materials, drug delivery, chemical synthesis, gas storage, and separation science.

The design of nanomaterials with novel topology using molecular self assembly has been the focus of intense activity because these materials have high surface area and permanent porosity when the guest molecules are removed from the host network. Particularly, metal organic frameworks (MOFs) have been recently exploited for gas storage and separation applications. Like zeolites, metal-organic frameworks (MOFs) are crystalline hybrid materials consisting of open frameworks that can accommodate several different guest or refrigerant molecules. Different than zeolites, MOFs represent a new class of functional materials consisting of metal centers linked with organic building blocks to produce diverse and customizable structural frameworks.

These metal centers and organic linkers readily self-assemble into materials with open framework structures, where all the porosity is accessible for storage applications. Several porous materials, such as zeolites and activated carbons, have been reported for gas storage applications, but MOFs have received considerable attention over the past few years because of the high mass flux, thermal stability (in excess of 500° C. for some MOFs), adjustable chemical functionalities and pore sizes, extra high porosity, and availability of hundreds of well characterized materials reminiscent of zeolites.

BRIEF SUMMARY OF THE INVENTION

The present invention represents a particularly promising technology by creating new demands for novel nanoparticles in thermal energy storage materials (TESM)—namely metal organic framework materials and other host-guest complexes. These new thermal energy storage materials can be incorporated into devices that need temperature moderation. Such devices can include shipping containers, heating ventilation and air conditioning systems, building construction materials, clothing, electronics, solar panels, water heaters, food and beverageware and numerous other applications.

In one embodiment of the present invention, a TESM includes a self-assembled nanotube with two different hydrophobic cavities.

The present invention is also directed to a process of activating a TESM. A TESM may be activated by adjusting the pressure inside the thermal storage material container to be higher or lower than the ambient pressure. For example, when cooling is desired, the pressure inside the thermal storage material container may be higher than ambient pressure. When heating is desired, the pressure inside the thermal storage material container may be lower than ambient pressure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Synthetic supramolecule self-assembled capsules can undergo changes to allow guest molecules to undergo rearrangement and the guest molecules to enter and leave. Despite keen interest in the self-assembly of simple organic building blocks into molecular containers, there is generally little information on the fate of the encapsulated guest molecules. The confined guest matrix within these molecular host containers has been regarded as "a new phase of matter." However, a detailed understanding of the interplay and relative orientations of the guest molecules has been restricted to a few instances. The use of these molecular host containers as a thermal energy storage media is a truly novel idea and a novel application of these nanomaterials.

Figure 1:
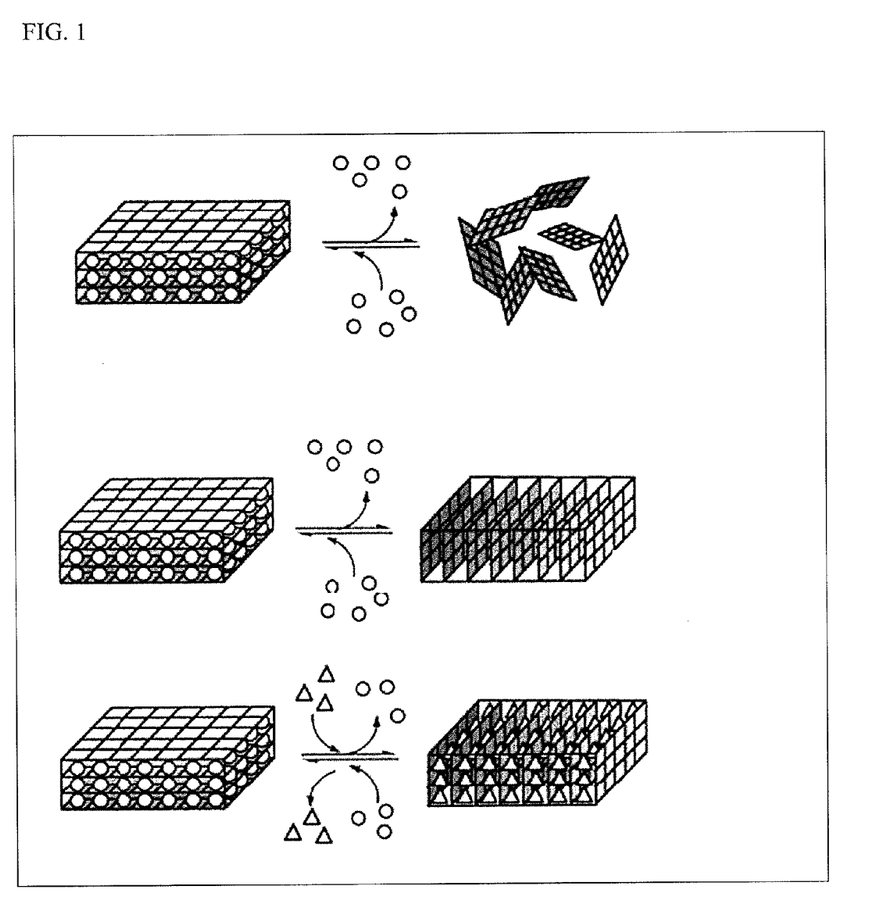
FIG. 1 is an illustration of various structural transformations that may take place during the guest absorption and desorption processes.

The synthesized nanomaterials that act as a "host" to other "guest" molecules were examined. In order for the guest molecule to come out of the host it must absorb a large amount of energy. With other complexes an increase in temperature causes one or more things happen to the host such as: 1) Crystal to amorphous transformation: the framework collapses on removal of the guest molecules; however, it regenerates under the initial conditions; 2) crystal-to-crystal transformation: removal of guest molecules results in a structural change in the network; as a consequence, the original network is obtained by the reabsorption of the same or different guest molecules; 3) the guest molecules will rearrange itself to an ordered-to-disordered or disorder-to-order state. All three possibilities are depicted in FIG. 1. Conversely, if the guest removal from any one of the above transformations involves the release of energy, but removal of the guest followed by the structural transformation of the host involves an excess of energy released from the host molecule because the host molecule is undergoing structural transformation to a thermodynamically more stable guest free form, the DSC curve of this particular system shows two endotherms: one corresponding to the guest coming out of the host lattice, and the other corresponding to the rearrangement of the host lattice. The energy released during such a transformation is typically higher than the heat of vaporization of water.

Our studies of host-guest molecular relationships have shown promising results with regard to the use of host-guest complexes for thermal energy storage. For example, a guest-host complex made from a pyrogallolarene derivative was analyzed. The guest was acetone. The peak enthalpy was at 97° C. and the endotherm of this material was 3,311 J/g. Acetone normally has a boiling point of 56° C. and a heat of vaporization of 987 J/g. For comparison, the latent heat of vaporization of water is only 2,264 J/g. Table 1 shows the maximum temperature of the endotherm and its enthalpy for several selected nanoparticles.

TABLE 1

| Host | Guest | Temperature ° C. | Enthalpy J/g |
|---|---|---|---|
| Metal organic framework | Dimethylformamide (DMF) | 41 | 253 |
| Selected nanosphere | Selected guest | 60 | 545 |
| Sulphonato-Calixarene-Nanobowl | Methanol | 74 | 239 |
| Selected nanobowl | Selected guest | 76 | 759 |
| Selected nanobowl | Selected guest | 92 | 1050 |
| Pyrogallolarene-Nanospheres | Acetone | 94 | 799 |
| Pyrogallolarene derivative | Acetone | 97 | 3311 |
| Selected nanosphere | Selected guest | 98 | 799 |
| Calixarene-Nanotubes | Acetone | 107 | 1121 |
| Dianin Compounds | Methanol | 111 | 436 |
| Metal organic framework | Dimethylformamide (DMF) | 116 | 1266 |
| Calixarene-Nanotubes | Acetonitrile | 133 | 792 |
| Selected nanotube | Selected guest | 144 | 356 |
| Dianin Compounds | Acetone | 160 | 252 |
| Calixarene-Nanotubes | Toluene | 167 | 281 |

We have explored the synthesis and properties of materials assembled through non-covalent binding (van der waals and hydrogen bonding interactions), and materials where stronger linkages take place through the incorporation of metal ions that coordinate with an organic ligand via covalent metal-oxygen or metal-carboxylate bonds.

Figure 2:
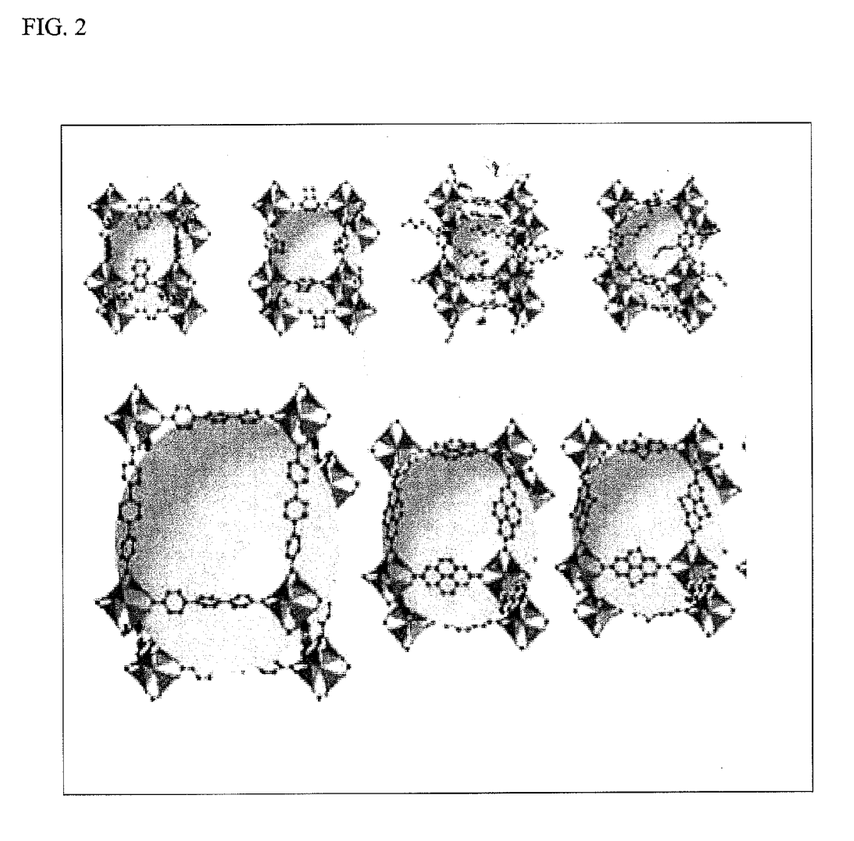
FIG. 2 is a depiction of metal-organic frameworks with different pore size diameters.

We have studied over 50 different host-guest compounds with various guest molecules. The host compounds included Dianin compounds, Metal Organic Frameworks, Pyrogallolarenes, and Sulphonato-calixarenes. These compounds were made into various structural shapes such as nanotubes, nanospheres, nanobowls and nanocages like metal organic frameworks. Depictions of metal organic frameworks with different pore size diameters are shown in FIG. 2.

In one aspect of the present invention, we have focused on the synthesis and characterization of chromium based metal organic frameworks that have been shown to have remarkable stability even after several cycles. Another advantage of chromium based MOFs include the meso-porous nature of the material, resulting in an approximately 10 times higher capacity than any other traditional materials, as confirmed by our laboratory results. Similarly, meso-porous MOFs tend to adsorb large amount of guest molecules at room temperatures. For example, MIL-101, which is a chromium based MOF, is shown to have 140 wt % of $CO_2$ at room temperature and higher pressure (30 bar). Similarly the same material adsorbs 1 kg/kg of water at room temperature.

Figure 3:
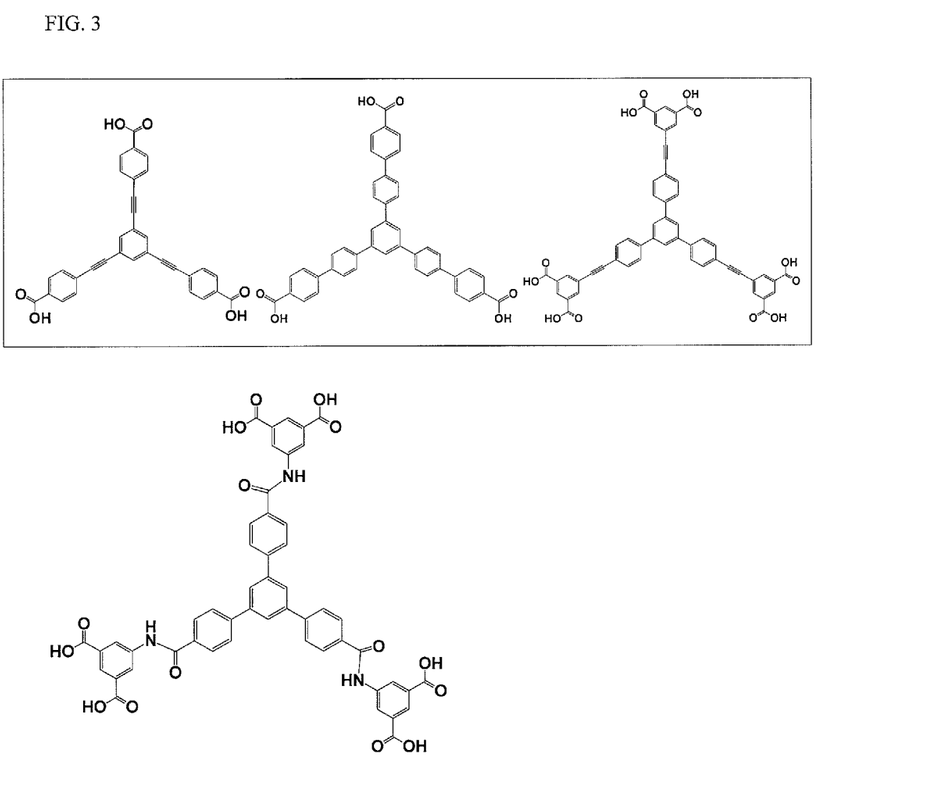
FIG. 3 depicts the chemical structures of primary and secondary building units.

MOF materials were constructed from organic and inorganic building blocks to generate porous framework materials with a surface area ranging from about 500 to 6000 $m^2$/g and a pore diameter of greater than 20 Å. Permanent porosity in these materials is imparted by the structural properties of the metal-carboxylate clusters, where each metal ion is locked into position by the carboxylates to produce rigid entities of simple geometry, referred to as secondary building units. From a range of metals and appropriate choice of organic linking blocks, a 3D framework can be constructed with a systematic variation of pore volume and functionality. These aspects can be modified to develop specific MOFs with properties suitable for various refrigerant or guest molecules. We have examined materials synthesized with various MOFs with different ligands such as 1,4-benzenedicarboxylic acid (BDC), benzenetricarboxylic acid (BTC), and those shown in FIG. 3 with appropriate substitution of transition metals. These materials are formed via a solvothermal synthesis route by using appropriate organic linker and metal nitrate salts. In brief, metal nitrate or acetate and organic building blocks are dissolved in water in a 1:1 ratio and added to the Teflon autoclave, upon which a precipitate is formed. After allowing the mixture to react at 110° C. for several hours, a hybrid material with desired pore sizes is formed.

We have also examined MIL-100 and MIL-101 (Material Institute Lavoisier), as these materials have pore size distribution and pores in the range of both micro and mesopores and are interconnected. For example, MIL-100Fe has mesopores with cages 25 and 29 Å in diameter constructed from iron trimers linked with tricarboxylate linkers. MIL-101Cr has pore diameters of 29 and 34 Å built from three chromium trimers and dicarboxylate linkers. The giant pore structure allows improved molecular accessibility, release of guest molecules at relatively low temperatures (<20° C.), and release of guest molecules for numerous cycles. Additionally, synthesis of these adsorption and desorption materials will take place in water, and these materials will retain high water stability and can be seen by the powder XRD studies before and after heating the sample at high temperatures (e.g. 250° C.). In addition to these existing materials, we followed another strategy of reticular chemistry for generating these extended mesoporous MOFs with pore sizes greater than 40 Å. The simplest way to accomplish such ultra-high pore structure is to use longer organic linker and secondary building blocks as an additive during the synthesis.

Figure 4A:
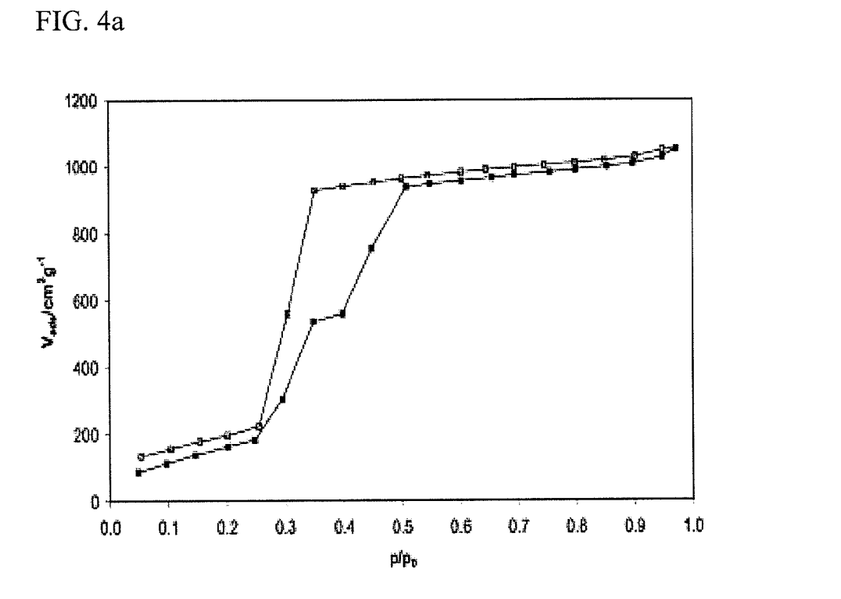
FIG. 4a is a graph illustrating the water adsorption and desorption isotherm for MIL-100Fe.
Figure 4B:
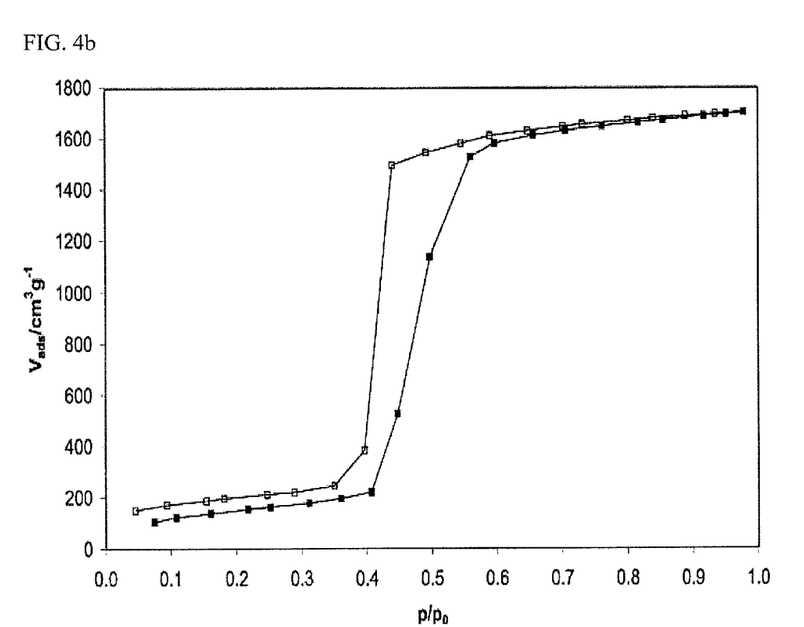
FIG. 4b is a graph illustrating the water adsorption and desorption isotherm for MIL-101Cr.

FIGS. 4a and 4b shows graphs of $V_{ads/cm}^3\ g^{-1}$ versus $p/p_0$. FIG. 4a is a graph illustrating the water adsorption and desorption isotherm for MIL-100Fe at 298K. FIG. 4b is a graph illustrating the water adsorption and desorption isotherm for MIL-101Cr at 298K. For both, the adsorption isotherm is shown by the data points represented by solid squares, and the desorption isotherm is shown by the data points represented by open squares. As shown by these graphs, water was released upon lowering the pressure. Also, as shown in FIG. 4, MIL-101Cr, at a relative pressure of 0.9, can adsorb 1.6 g of water per gram of MIL-101 Cr. A discussion of adsorption characteristics of MIL-101 is found in Ehrenmann, Henninger, & Janniak, "Water Adsorption Characteristics of MIL-101 for Heat-Transformation Applications of MOFs," *Eur. J. Inorg. Chem.* 2011, 471-474, the contents of which are incorporated herein by reference.

By conducting additional measurements at higher pressure and temperature conditions and with additional refrigerants, it is possible to fully analyze the performance improvement achievable with a TESM based on these materials and others.

Supramolecular Covalent Organic Frameworks (SCOFs)

Figure 5:
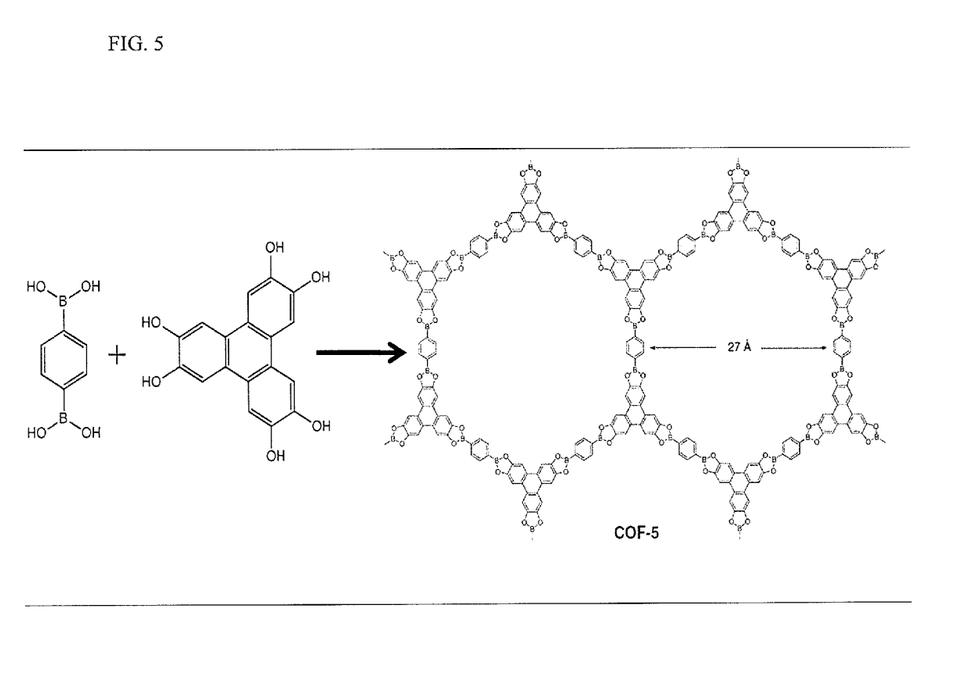
FIG. 5 is a schematic representation of a proposed supramolecular covalent organic framework material.

The SCOFs/COFs are porous crystalline extended aromatic framework materials where the organic building blocks are linked by strong covalent bonds. The attractiveness behind these materials was exclusively the use of light elements such as H, B, C, N and O which are known to form well established materials (e.g. graphite, diamond, boron nitride, etc.) with strong covalent bonds. The fine tunability of the organic building block with various functional groups, extending the size, leads to the formation of lightweight functionalized micro/meso porous covalent frameworks with desired applications. Due to the covalent bonding, these materials exhibit robust structures with exceptional thermal stabilities and low densities with permanent porosities. Since the COFs allow total control over structural parameters that include porosity and composition, by considering the high thermal energy storage output, extended mico/mesoporous covalent structural networks have been designed and synthesized. Based on previous studies of calixarenes and coupled with their limitations as high thermal energy storage materials, new COF materials may be designed by combining the applications of porous networks and supramolecular ligands. The supramolecular building block (e.g. calixarenes, resorcinols, cyclodextrins, porphyrins, etc.) may be linked with an organic boronic acid to yield SCOF (supramolecular covalent organic frameworks) that show the properties of individual supramolecules and the extended porous network. A schematic representation of potential building blocks for SCOFs is shown in FIG. 5. Without intending to be bound by theory, SCOFs, due to unique properties from individual supramolecule characteristics (host-guest chemistry) together with extended covalent structural framework, is expected to result in high thermal energy storage.

Characterization work uses a broad range of techniques including single crystal x-ray diffraction, differential scanning calorimetry, thermogravimetric analysis, multi-component gas analysis to determine absorption/desorption isotherms, powder x-ray diffraction, nuclear magnetic resonance, and BET (Brunauer, Emmett, Teller) surface analysis. Single crystal x-ray analysis is used to determine the arrangement of organic molecules in the solid-state and void space or binding sites of the host. After interpreting various structural characterization results, the adsorption/desorption kinetics, heat of adsorption and refrigerant mass loading is measured. The combination of measurements provides the critical data required to select materials that are used for cooling-cycle performance analysis and testing.

Materials were characterized by powder X-ray diffraction (PXRD), BET surface area analysis, thermogravimetric analysis (TGA) and differential scanning calorimetric (DSC) analysis respectively. Powder X-ray diffraction measurements (PXRD) were performed as synthesized, and after activation of the sample under vacuum at various temperatures showed identical PXRD patterns. This clearly indicates that the stability of the host framework remains intact upon removal of trapped water molecules.

Differential scanning calorimetry (DSC) and thermogravimetric analysis coupled to mass spectrometry (TG-MS) were performed on sorbents. The DSC and TG-MS results show excellent consistency in terms of desorption temperature. The temperature at which the endothermic peak is observed in the DSC plots coincides with the temperature at which the mass peak of the desorbed solvent shows on the TG-MS analysis. PXRD analysis showed in some cases structure rearrangement of the sorbent material after solvent desorption. However, all materials seem to retain their crystallinity which makes most of the sorbents reported suitable for recycling.

Certain characteristics of the host structure can potentially limit the range of applicable approaches or the absolute accuracy of the calculated energies. For some systems, free energy differences between guest-host systems with different guest molecules but the same host molecule can be calculated to higher precision than the absolute formation energy. The empirical potentials needed are well established for many guest molecules, including water, methane, carbon dioxide, ethanol, acetone, and others. The potentials for the host are initially taken from the literature in similar systems, but they will be refined if relevant experimental data are available.

Calculations of a TESM MOF-210 Used to Adsorb Carbon Dioxide

Figure 6:
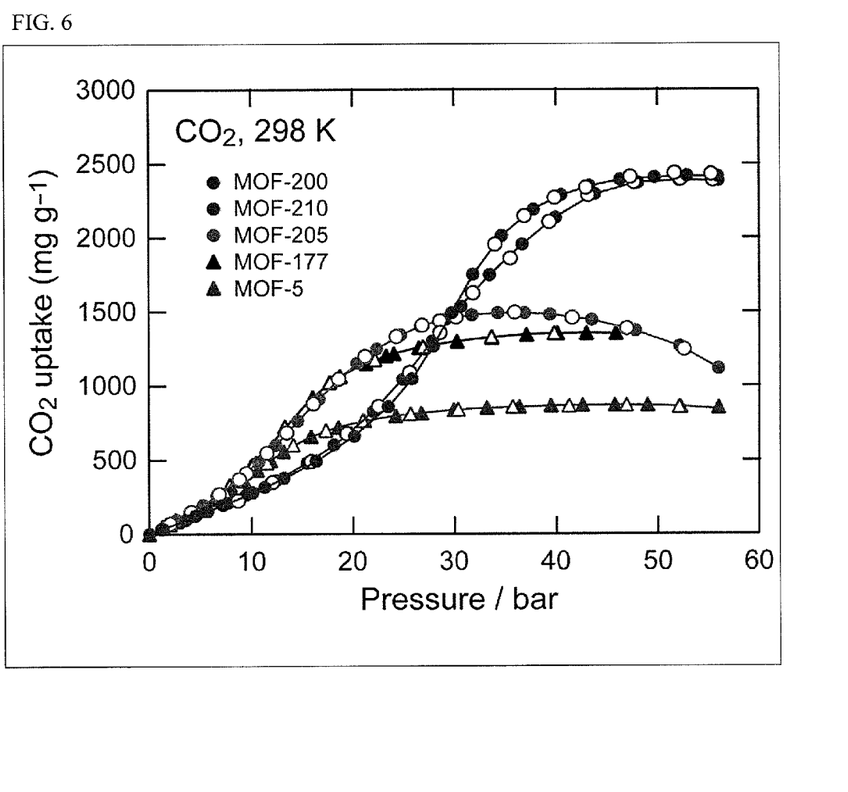
FIG. 6 is a graph showing isotherms of $CO_2$ with different metal-organic frameworks measured at 298K.

At 50 Bar and 298K, MOF-210 can adsorb ~2.5 g $CO_2$ per gram of MOF. $CO_2$ has a $\Delta H$ of 1000 J/g. MOF-210 has a density of 0.25 g/ml. Therefore, 1 ml of MOF-210 at 50 Bar of $CO_2$ could provide 625 J of cooling or heating just by controlling pressure at 298K. A graph of $CO_2$ uptake versus pressure is shown in FIG. 6. This graph is found in Furukawa et al., "Ultrahigh Porosity in Metal-Organic Frameworks," Science, 23 Jul. 2010, 329 (5990): 424-428, the contents of which are incorporated by reference herein.

Calculations of a TESM MIL-101 Used to Adsorb Water

At 298K, MIL-101 can adsorb 1.6 g of water per gram of MIL-101 at a relative pressure (P/Po) of 0.8. Water has a $\Delta H$ of 2257 J/g (binding energy not included). MIL-101 has a density of around 0.8 g/ml. Therefore, 1 ml of MIL-101 with water at a relative pressure of 0.8 or higher could provide 2889 J of cooling or heating just by controlling pressure at 298K. A graph of the water adsorption and desorption isotherm of MIL-101 at 298K is found in FIG. 4b.

For systems where the empty host system is stable, the energy of incorporation of different guest molecules can be calculated by thermodynamic integration. In this technique, the Hamiltonian for the interaction of the guest with the host is altered on a fictitious path from full to zero. Since free energy is a thermodynamic state function, the non-physical path is valid, and this calculation is computationally relatively straightforward although very lengthy. If the empty host is unstable, as is the case for many calixarenes, then this approach will fail as the interaction approaches zero. In this case, the calculation of relative free energies of formation would be calculated. In this technique, the Hamiltonian is altered along a path in which one guest molecule is artificially transformed into another. If stable host structures are obtained for both systems with similar crystal structure, the difference in free energy of incorporation for the two guest molecules is calculated. Calculations involving a single guest and single cage structures are also possible, which can provide estimates of free energy differences at dramatically lower computational cost.

Integrationg MOFs or Other Host-Guest Complexes into Thermally Conductive Materials In one embodiment, the present invention is directed to a host-guest complex in contact with a thermally conductive material. The thermally conductive material may be a material such as graphite, aluminum, copper, or other thermally conductive materials.

MOFs and other guest-host complexes typically have relatively low thermal conductivities of typically 0.4 W/m*K or lower. Therefore, in order for the thermal energy generated/absorbed by the MOF or host-guest complex to be efficiently utilized there has to be a methodology to effectively transfer the thermal energy throughout the system.

By using expanded graphite additives we have increased our thermal conductivity from less than 0.5 W/m*K to over 10 W/m*K. Various types of graphite materials are used for thermal conductivity enhancement. Such varieties include powdered graphite, flaked graphite, graphite sheets, expanded graphite flakes, expanded graphite plates that have a 90% void space, graphite foil, graphite textile material, graphite felt, graphite mesh and many more forms of graphite. If desired we can use binders to create a monolithic structure or keep the graphite and MOF in an unbound loose state. If using binders then we must be aware of keeping the structure fairly porous and not clogging or fully coating the MOFs.

Construction of a System Prototype with Passive Heat Pipe Based Heat Exchangers

In one embodiment of the present invention, a host-guest complex is in contact with a heat pipe used for heat exchange. A typical prototype design may use a series of heat transfer pipes to conduct heat from a heat exchanger to the TESM impregnated into the graphite monolith or to be referred to as the "thermal battery."

Operation: For cooling applications,
1. The thermal battery is charged to pressure. (NOTE: the pressures used will typically be 500-900 psi.)
2. Air is blown over the heat exchanger to cabin.
3. The Controller monitors the air temperature over the cabin heat exchanger and the temperature inside the thermal battery.
4. As needed the controller will open the pressure control valve to release the guest into the environment or into a secondary containment vessel as needed. This provides the cooling effect.
5. The cooling effect that occurs in the thermal battery will be transferred through the heat pipes to the heat exchanger to cabin.

Operation: For heating applications,
1. The thermal battery is not charged but vacant of guest molecules.
2. Air is blown over the heat exchanger to cabin.
3. The Controller monitors the air temperature over the cabin heat exchanger and the temperature inside the thermal battery.
4. A secondary tank is used to pressurize (charge) the thermal battery through the pressure control valve. This provides the heating effect.
5. The heating effect that occurs in the thermal battery will be transferred through the heat pipes to the heat exchanger to cabin.

Heat pipes are proven technologies to passively move heat over short distances. The container needs to incorporate host-guest complexes that can endure extremes in temperature, be insulated from heat, and be thermally conductive for the heat pipes.

Heat Pipes use a working fluid that undergoes vapor-liquid phase transitions to efficiently conduct heat from the evaporator/condenser to the thermal battery. Working fluid flow is induced in the heat pipes by condensation at the cool side and evaporation at the heat source.

The degrees of freedom in the container design include the following:
1. Geometry.
2. Materials of construction.
3. Number of walls (inner, outer, other).
4. Type of insulation between walls.
5. Number of heat pipes.
6. Types of fins on the heat pipes.
7. Ability to modify the effective heat transfer geometry.

The following summaries provide further detail on the container design:

Geometry—The preferred geometry will be a flat panel. As a backup plan, a cylindrical geometry will be used.

Materials of Construction—Stainless steel is the preferred material of construction. Many commercially available steel containers can easily handle double or triple the pressures at which the prototype will operate.

Figure 7:
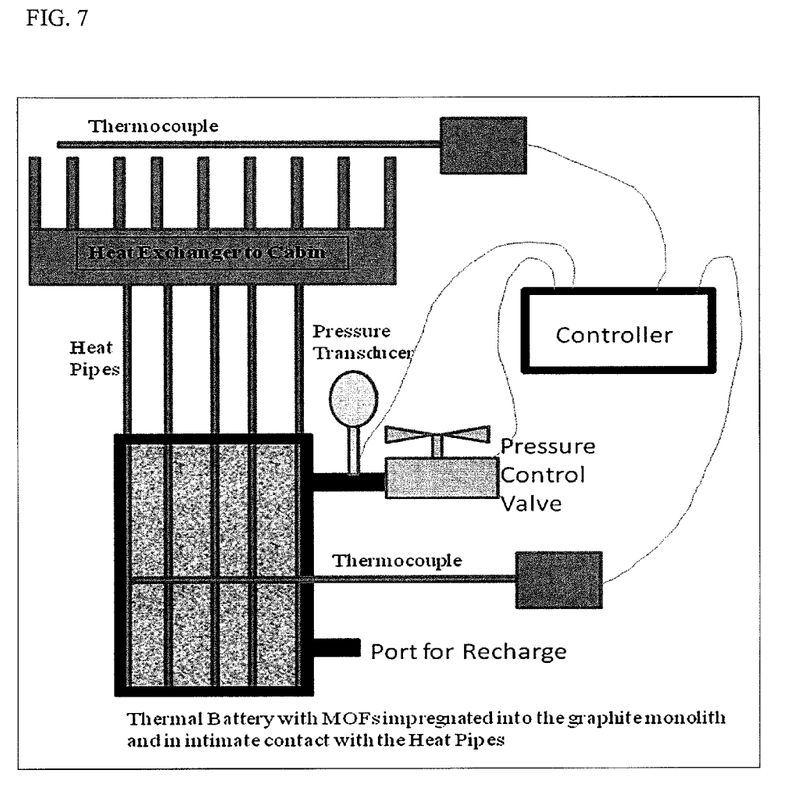
FIG. 7 is a diagram of a simplified prototype design using a series of heat transfer pipes to conduct heat from a heat exchanger to a thermal energy storage material impregnated into a graphite monolith.

A simplified prototype design is shown in the diagram of FIG. 7. This diagram shows a thermal battery with MOFs impregnated into the graphite monolith and in intimate contact with the heat pipes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A thermal energy storage material, comprising:
a host-guest complex, wherein combined rotational, vibrational, translational, and binding energies of a guest molecule are dependent upon a temperature of a surrounding environment.

2. The thermal energy storage material of claim 1, wherein the host-guest complex comprises nanoparticles having a topography, selected from the group consisting of nanotubes, nanobowls, nanospheres, and nanocages.

3. The thermal energy storage material of claim 1, wherein the host-guest complex comprises a metal organic framework.

4. The thermal energy storage material of claim 1, wherein the guest molecule is selected from the group consisting of water, carbon dioxide, carbon monoxide, nitrogen, oxygen, acetone, methanol, and ethanol.

5. A thermal energy storage material, comprising:
a host-guest complex and a container holding the host-guest complex, wherein combined rotational, vibrational, translational, and binding energies of a guest molecule are dependent upon a pressure in the host-guest complex and the container holding the host-guest complex.

6. The thermal energy storage material of claim 5, wherein the host-guest complex comprises a host and a guest, and the host-guest complex provides a cooling effect when the guest leaves the host.

7. The thermal energy storage material of claim 5, wherein the host-guest complex comprises a host and a guest, and the host-guest complex provides a heating effect when the guest binds to the host.

8. The thermal energy storage material of claim 5, wherein the guest molecule is selected from the group consisting of water, carbon dioxide, carbon monoxide, nitrogen, oxygen, acetone, methanol, and ethanol.

9. The thermal energy storage material of claim 5, wherein the host-guest complex comprises nanoparticles having a topography, selected from the group consisting of nanotubes, nanobowls, nanospheres, and nanocages.

10. The thermal energy storage material of claim 5, wherein the host-guest complex comprises a metal organic framework.

11. The thermal energy storage material of claim 5, wherein a pore in the host-guest complex is greater than 25 angstroms in diameter.

12. A method for providing climate control to a cabin of a vehicle, comprising:
providing a host-guest complex; and
activating a device that changes a pressure inside the host-guest complex.

13. The method of claim 12, wherein a temperature of air delivered to the cabin for heating is in a range from about 40 to 60 degrees C.

14. The method of claim 12, wherein a temperature of air delivered to the cabin for cooling is in a range from about 3 to 10 degrees C.

15. The method of claim 12, wherein said method provides an activation time of less than 4 hours.

16. The method of claim 12, wherein said method provides a minimum power capability of thermal energy storage of cooling of about 2.5 kWt and of heating of about 2.5 kWt.

17. The method of claim 12, wherein said method provides a minimum power capacity of thermal energy storage of cooling of about 2.5 kWt and of heating of about 2.5 kWt.

* * * * *